UNITED STATES PATENT OFFICE.

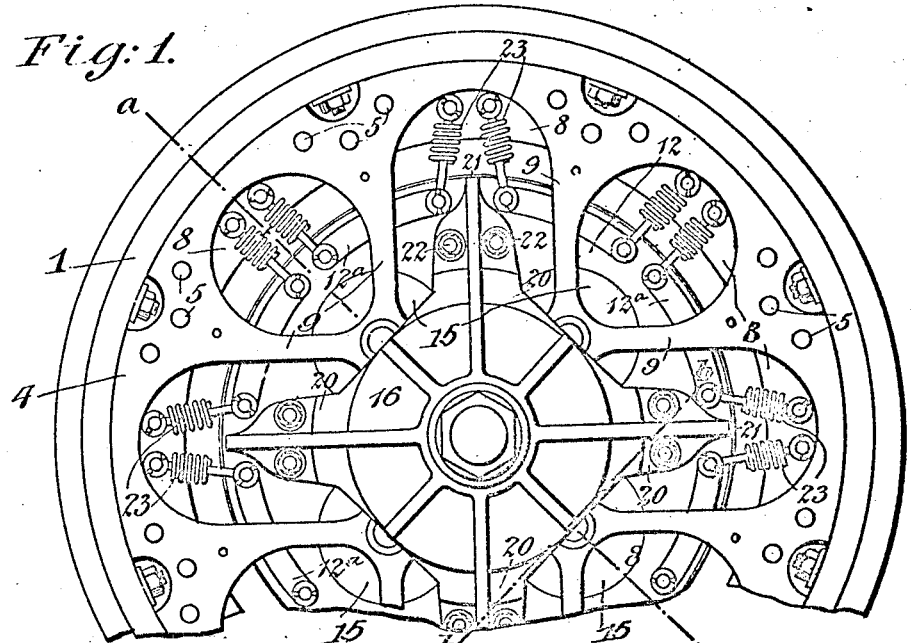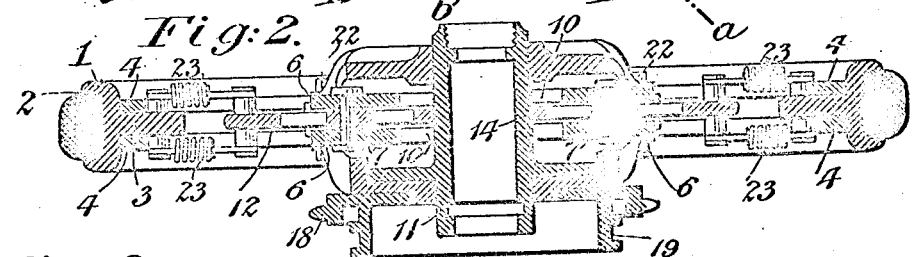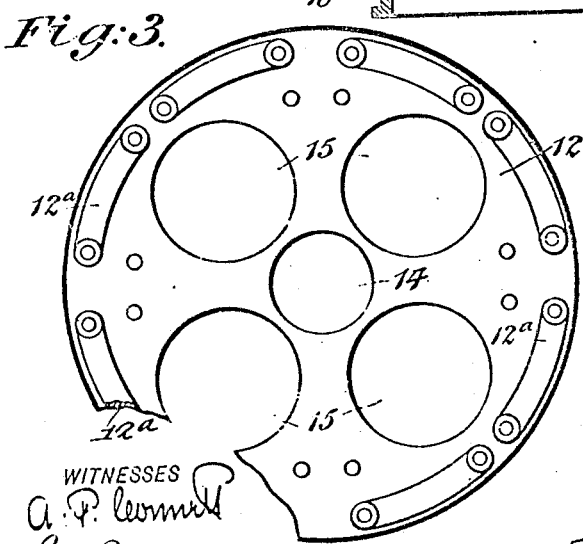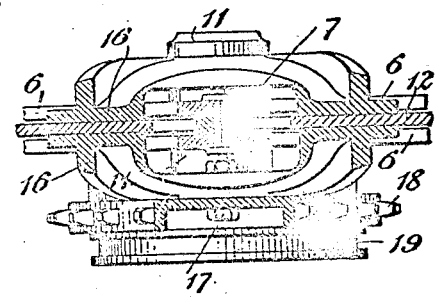

GABRIEL GASTON TRANNOY, OF CHARENTON, FRANCE.

VEHICLE-WHEEL.

No. 895,127.  Specification of Letters Patent.  Patented Aug. 4, 1908.

Application filed May 31, 1906. Serial No. 319,633.

*To all whom it may concern:*

Be it known that I, GABRIEL GASTON TRANNOY, a citizen of the French Republic, residing at Charenton, Department of the Seine, France, have invented certain new and useful Improvements in Vehicle-Wheels, of which the following is a specification.

This invention relates to certain improvements in vehicle wheels and more particularly in that class which are provided with resilient means for taking up or lessening the shocks due to contact with obstructions and unevenness in the road way so as to lessen the strains which would otherwise be imposed upon the vehicle, and the object of the invention is to provide a wheel of this general character of a simple and comparatively inexpensive nature and of a strong and compact construction wherein the resilient means are so arranged as to facilitate the starting and stopping of the vehicle, and whereby the liability of breakage or derangement of the parts during use of the improved wheel is materially lessened.

The invention consists in certain novel features of the construction, and combinations and arrangements of the several parts of the improved vehicle wheel, whereby certain important advantages are attained, and the vehicle wheel is rendered simpler, cheaper and otherwise better adapted and more convenient for use, all as will be hereinafter fully set forth.

The novel features of the invention will be carefully defined in the claims.

In the accompanying drawings which serve to illustrate my invention—Figure 1 is a partial side elevation of a wheel embodying my improvements; Fig. 2 is a sectional view taken transversely through the wheel in the plane indicated by the line *a*—*a* in Fig. 1; Fig. 3 is a partial side view of the inner member of the improved wheel, and Fig. 4 is a sectional detail view taken in the plane indicated by line *b*—*b* in Fig. 1 and showing certain features of construction to be hereinafter referred to.

As shown in these views 1 represents the outer rim portion of the improved wheel, said rim portion being herein shown as made in the form of a circular band or annulus of metal having a grooved perimeter 2 adapted to receive a rubber or other tire in a well known way and being provided with a thin centrally arranged and inwardly directed annular flange or web portion 3 integrally produced upon and extended around it.

4, 4 represent circular members, of flattened metal, the outer edge portions of which are fitted inside of the rim portion 1, being secured flush upon opposite sides of the web portion or flange 3 thereof by means of rivets 5, or like fastenings. The central portions of these side members 4, 4 are held spaced apart from each other by means of spacing devices 6, 6 extended across the space between them at suitable points, bolts 7, 7 being passed through the said members and spacing devices as clearly shown in Fig. 2 to hold the parts in secure relation.

At suitable points the respective side members 4, 4 have registering apertures 8, 8 produced in them, and said apertures are so disposed in the said members as to produce at the central portion of each member portions 9, 9 extended at angles to each other somewhat after the fashion of the spokes of an ordinary wheel. Each side member 4 is also provided with a central circular aperture 10, concentric with the rim portion 1 of the improved wheel and adapted for the passage of the hub 11 which, as herein shown is of less diameter than said central apertures 10, 10 so as to permit of a certain extent of movement without contact upon the side members such as is required for the operation of the resilient devices of the improved wheel as will be hereinafter explained.

12 represents an inner disk-like member also formed from flat metal of a thickness permitting it to be held loosely between the spaced inner portions of the side members 4, 4 and of a diameter less than the inner diameter of the flange or web portion 3 of the rim portion 1 so that when the parts of the improved wheel are in relation, the perimetral edges of said inner disk-like member 12 are separated from the inner edge surfaces of the web portion 3 by an annular space extended entirely around the wheel.

The inner disk-like member 12 has a central circular opening 14 of a diameter to fit snugly upon the hub 11 when the parts are in relation so that said disk-like member is caused to partake of the movement of the hub whereon the weight of the vehicle is, of course, imposed, whereby the said disk-like member is caused to slide between the spaced side members 4, 4 and said disk-like member 12 is provided with suitably arranged circular apertures 15 through which the spacing devices 6, 6 are passed, said apertures 15 being of sufficient diameter to permit free movement of the disk-like member in unison with the hub 11.

The thickness of the disk-like member 12 is less than that of the chamber or space separating the side members 4, 4, and at opposite sides of said disk-like member there are secured suitably arranged wearing strips 12ª, of bronze or the like which are adapted for sliding contact upon the inner surfaces of the spoke-like portions 9, 9 of the side members when the parts are assembled, in such a way as to prevent lateral movement of the disk-like member 12 and at the same time lessen the friction which would be present were said member 12 adapted for contact upon the entire surfaces of the portions 9, 9.

Upon opposite sides of the wheel are arranged casings 16, 16 each of which has a laterally directed central portion provided with a chamber or recess upon its inner side and securely fitted upon an end of the hub 11 outside of the corresponding side member 4, and one of said casings has connection by means of bolts 17 or the like, as shown in Fig. 4, with a flange produced around the end of said hub 11. As herein shown, a driving wheel 18 and brake drum 19 are also secured upon one of the casings so as to permit the driving and brake mechanisms to operate at the wheel in a well known way.

The respective casings have arms 20 which are extended within certain of the apertures 8, 8 of the respective side members 4, 4 and have their extremities fitted flush upon the opposite side surfaces of the inner disk-like member 12, as clearly shown at 21. bolts 22 or the like being passed through said extremities of the arms 20 of said casings and through said disk-like member 12 in order to secure the parts in relation.

At the registering apertures 8 produced in the opposite side members of the improved wheel there are arranged spiral springs 23, of which two are provided at each pair of registering apertures, the said springs being arranged to bridge or extend across the annular space separating the web portion 3 of the wheel rim from the inner disk-like member 12 and having their outer ends secured to said portion while their inner ends are connected with projections upon the sides of the disk-like member 12 in such a way as to afford resilient connections for holding the inner disk-like member 12 and the hub 11 elastically supported within the wheel rim during use of the improved wheel.

By this arrangement of the parts it will be seen that shocks due to inequalities in the roadway or obstructions encountered by the tire are absorbed and equalized by the spring and are not transmitted to the vehicle, and consequently the liability to breakage of the parts and disagreeable journeying of the vehicle when driven over rough roadways is greatly lessened, the side members 4, 4 playing along the sides of the disk-like member 12 and serving to prevent lateral movement of the parts and also to take up the stress which would otherwise be imposed upon the springs in case the wheel should skid or slip laterally of the roadway.

The improved vehicle wheel constructed according to my invention is of an extremely simple and comparatively inexpensive nature and is particularly well adapted for use by reason of the strength and compactness of its construction and also by reason of the fact that the employment of the resilient devices permits the strains at stopping and starting to be equalized so that liability of breakage due to the sudden imposition of such strains is practically avoided.

It will also be seen that the portions 24 of the members 4, 4 through which the bolts 7 are passed are adapted, in case of excessive turning of the disk-like member 12 relative to said side members 4, 4 to contact with the arms 20, 20 of the casings 16—16 in such a way as to form stops to prevent further relative movement of the parts, and in this way such relative movement is confined within the limit of tensible movement of the springs so that the liability of breakage or distortion of the springs due to such excessive movement is effectively prevented.

Having thus described my invention, what I claim and desire to secure by Letters Patent is—

1. A vehicle wheel comprising a rim portion having side members projecting inwardly around it and spaced apart to produce a chamber between them, a hub having a disk-like member projecting in annular arrangement from it and fitted for edgewise sliding movement in said chamber, springs affording connection between said disk-like member and the rim portion, said disk-like member being of less thickness than the chamber between the side members, and wearing plates of anti-friction metal held upon and projecting from the opposite faces of the disk-like member and contacting with the inner faces of the side members to hold the disk like member out of contact with said side members.

2. A vehicle wheel comprising a rim portion having side members projecting inwardly around it and spaced apart to produce a chamber between them, a hub having a disk-like member projecting from its central part and fitted for edgewise sliding movement in said chamber, springs affording connection between said disk-like member and the rim portion, said side members being provided with apertures, and casings surrounding the opposite ends of the hub outside of the side members and having parts extended through the apertures in said side members and attached to said disk like member.

3. A vehicle wheel comprising a rim portion having side members projecting inwardly around it and spaced apart to produce a chamber between them, a hub having a disk-like member projecting from its central part and fitted for edgewise sliding movement in said chamber, said side members having apertures produced in them communicating with the chamber wherein the disk-like member is fitted and at which the opposite sides of the said disk-like member are exposed, and spiral springs arranged in said apertures of the side members and connecting the disk-like member with the rim portion.

In witness whereof I have hereunto signed my name this 4th day of May 1906, in the presence of two subscribing witnesses.

GABRIEL GASTON TRANNOY.

Witnesses:
 JULES ARMENGAUD, Jeune,
 HANSON C. COXE.